INVENTOR.
Frank Dickenbrock

March 4, 1969  F. DICKENBROCK  3,430,504
TRANSMISSION
Filed Aug. 29, 1966  Sheet 2 of 2

INVENTOR.
Frank Dickenbrock
BY
Robert L. Spencer
ATTORNEY

United States Patent Office 3,430,504
Patented Mar. 4, 1969

3,430,504
TRANSMISSION
Frank Dickenbrock, Warren, Mich., assignor to General Motors Corporation, Detroit, Mich., a corporation of Delaware
Filed Aug. 29, 1966, Ser. No. 575,682
U.S. Cl. 74—200          8 Claims
Int. Cl. F16h 15/08

This invention relates to an improved ratio control system for friction transmissions of the infinitely variable ratio type. The control system steers the friction rollers from any initial position to any desired position relative to the races, and is constructed such that in accomplishing roller steering only small forces are required to incline the roller and such inclination of the roller produces large forces trying to tilt the roller. The control system will produce a roller inclination when a new ratio is desired, will reduce the roller inclination to zero when the desired ratio is arrived at, and will maintain the roller in its desired position without hunting.

The transmission includes a support sleeve supported in spiders spaced axially on opposite sides of the roller power input races for two friction units and extending through each input race. The input races in turn are rotatably supported upon a second sleeve external of the fixed support sleeve and needle bearings are positioned between the two sleeves and beneath the input races. The support sleeve further rotatably supports ratio control collars for both friction units and supports the power delivery shaft driven by the power delivery races of both units. The arrangement whereby the power input races are disposed in close proximity to each other and axially inwardly of the support spiders together with support sleeve and power delivery shaft extending axially outwardly from both spiders for supporting the power delivery races provides a compact rigid support structure for the rotating races.

In addition, an easily adjustable means is provided for initially adjusting the control pin which actuates the roller carriers so that the position of the pin relative to the control arm on the cradle may be initially adjusted relative to the cradle control arm to control or vary both slope of the actual desired roller tilt angle curve and to control or vary the position of the roller actual tilt angle curve vs. the desired roller tilt angle curve. This is advantageous in that it provides a simple means for correcting for stack-up of errors in manufacturing tolerances of the ratio control mechanism. This initial adjustment is accomplished by providing an adjustment clip in which the ratio control pin is mounted and by adjusting the clip vertically relative to the cradle control arm as by placing a shim of desired thickness between the clip and control arm to control the position of the actual tilt angle curve to obtain the desired tilt angle curve. To control the slope of the tilt angle curve to obtain the slope of the actual desired tilt angle curve, the clip may be moved inwardly or outwardly along the axis of the cradle control arm. Once the adjustment clip is properly adjusted to the desired position relative to the cradle control arm the clip is rigidly clamped to the cradle control arm.

The above and other advantages of this invention will be apparent from the description and claims taken in conjunction with the accompanying drawings, in which:

Figures 1, 2:
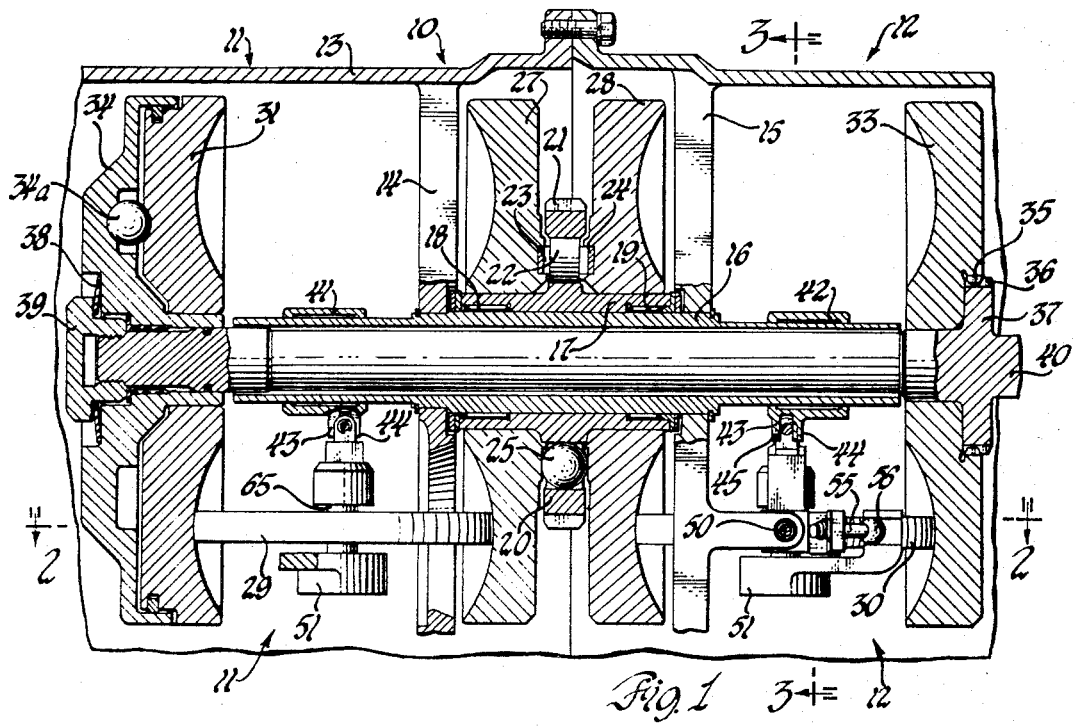
FIGURE 1 is a longitudinal sectional view through the transmission.
FIGURE 2 is a sectional view taken along the line 2—2 of FIGURE 1.

In FIGURE 1 there is shown a toric type friction roller transmission generally indicated at 10 and including axially spaced front and rear roller sections indicated generally at 11 and 12. A support sleeve shaft 16 is supported in axially spaced spiders 14 and 15 of the front and rear sections, both spiders being grounded to housing 13. A sleeve 17 supported on the external surface of support sleeve 16 is rotatable relative to sleeve 16. Bearings 18 and 19 are disposed between sleeves 16 and 17 in the area beneath front and rear unit toric drive power input races 27 and 28 respectively. A central upstanding drive flange 20 on sleeve 17 extends radially outwardly intermediate races 27 and 28 and is provided with a power input gear 21 on its periphery. Gear 21 may mate with an engine driven gear (not shown). Flange 20 is drilled axially to receive a drive connector 22 and an axial ball loader 25. Connector 22 is provided with axially extending ears 23 and 24 extending into recesses in drive races 27 and 28 to drive the races in response to rotation of flange 20.

A front unit driven toric race 31 is adapted to be driven by a disc roller 29 and a rear unit driven race 33 is adapted to be driven by a disc roller 30 upon rotation of power input races 27 and 28. Torque is transmitted from race 31 to a power delivery shaft 40 through a housing 34 splined to shaft 40 for rotation therewith and for axial movement with respect thereto. Race 33 transmits torque to shaft 40 through mating splines 35, 36 formed on race 33 and an upstanding flange 37 on shaft 40. Flange 37 also functions as a backing member for race 33.

Axial loading of the assembly is provided by a Belleville spring 38 seated on an adjustable nut 39 screwthreaded to shaft 40. The axial load is transmitted through a ball 34a intermediate axially movable housing 34 and race 31, through roller disc 29, input race 27, ball 25, input race 28, roller disc 30 to race 33. Flange 37 on shaft 40 serves as a reaction member for the axial loading forces. Since Belleville spring 38 is also grounded to shaft 40 through nut 39, all of the axial loading forces of the system are grounded to a common member, shaft 40. Shaft 40 extends through and is rotatably supported by support sleeve 16. In addition to supporting the sleeve 17, power input races 27 and 28 and output shaft 40, support sleeve 16 extends axially into both the front and rear units to support front and rear unit ratio control collars 41 and 42, the collars being rotatable relative to sleeve 16.

Figure 3:
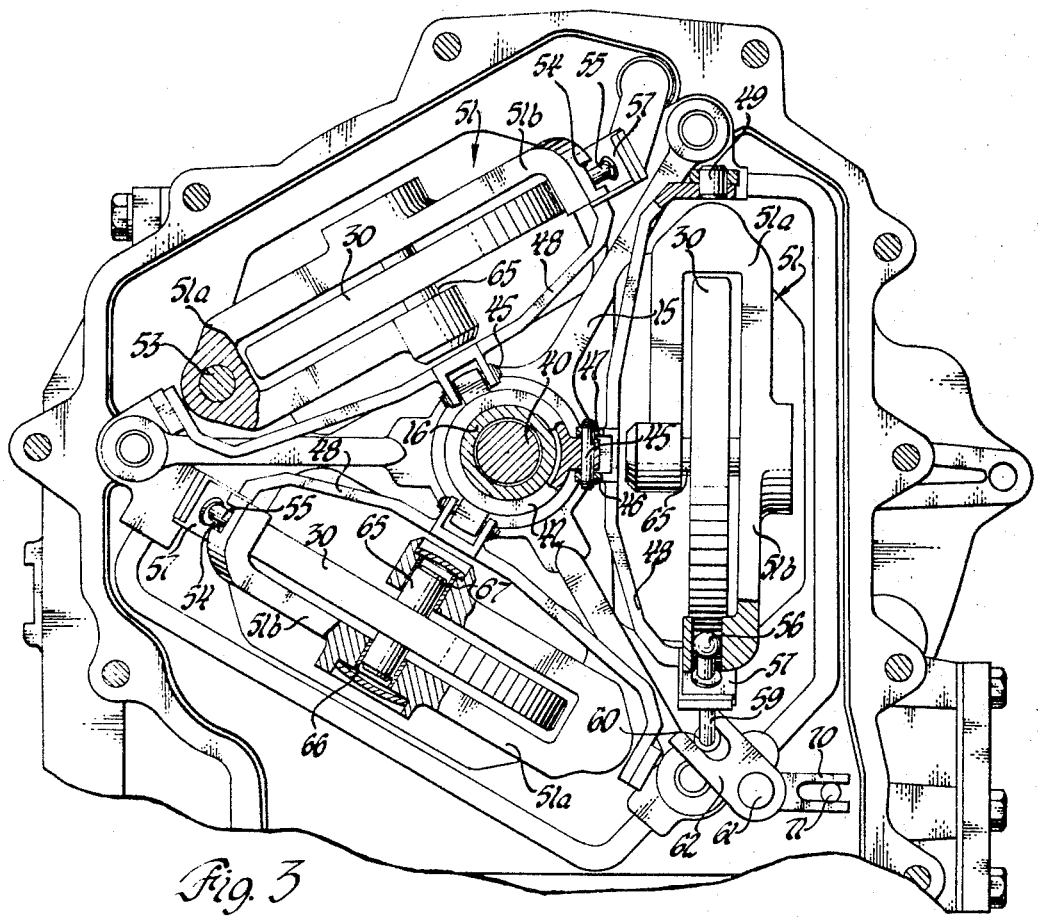
FIGURE 3 is a sectional view taken along the line 3—3 of FIGURE 1.

Referring to FIGURES 1 through 3, rear unit ratio control collar 42 is provided with spaced ears 43, 44 adapted to receive a roll pin 45 extending through spaced ears 46, 47 of a cradle 48. Cradle 48 is supported at its opposite ends in spider 15 for angular rotation relative to spider 15 by means of pins 49 and 50, respectively. A generally L-shaped roller carrier 51 is supported at one end through a swivel joint connection to the ball head 53 of a mooring mast 52 grounded to spider 15. The carrier portion 51a, between the point of connection of the ratio control collar 42 to cradle 48 by pin 45 and carrier swivel support 53, extends coaxial with a line extending through the center longitudinal axis of cradle support pins 49 and 50. The carrier portion 51b extending from the pin connection 45 to the opposite end of the carrier is at an acute angle with respect to a line passing through the center line of cradle support pins 49, 50. The free end of carrier portion 51b is provided with a slot 54 to freely receive a ball head 56 of a control pin 55 supported in a control arm 57 of cradle 48. An elbow extension 59 on cradle support pin 50 is provided with a ball head 60 disposed in a fork 62 rotatable with a phasing shaft 61 rotatably supported in supports 63, 64.

The front unit assembly 11 shown in FIGURE 2 is the same as the rear unit 12 just described. Accordingly, except for the insertion of reference numerals identifying parts similar to those of the front unit, further specific description of rear unit 12 as shown in FIGURE 2 is not believed necessary. It will be understood that cradle 48 of the front unit is supported in spider 14, rather than spider 15. It will also be understood that rotation of roller phasing shaft 61 will simultaneously change the drive ratio of both the front and rear units. Shaft 61 may be rotated by any suitable means, such as for example, a hydraulic servo piston (not shown) which may be connected to shaft 61 by suitable bell crank linkage (not shown) to rotate the shaft in response to movement of the piston. Upon rotation of shaft 61, forks 62 acting on balls 60 of elbows 59 rotate pins 50 and control arms 57 of both units causing pins 55 acting in slots 54 of carriers 51 to tilt the carriers 51 about swivel balls 53.

The disc rollers of each unit are supported in carriers 51 by shaft 65 best shown in FIGURE 3. As shown in FIGURE 3, each drive unit includes three rollers to minimize roller loading and wear to increase the life of the roller discs. Rollers 30 are rotatably supported in carriers 51 by roller support shafts 65 and bushings 66, 67. Each carrier 51 includes the arm 51a supported on ball 53 with laterally offset arm 51b provided with slot 54 for receiving one end of a control pin 55 supported in cradle control arm 57 formed on cradle 48. Each cradle 48 is connected to ratio collar 42 by means of a pin 45 as heretofore described. Ball 60 of elbow 59 is received in fork 62 rotatable with phasing shaft 61. A fork 70 affixed to shaft 61 may be rotated by movement of a pin 71 to change the transmission drive ratio.

Figure 4:
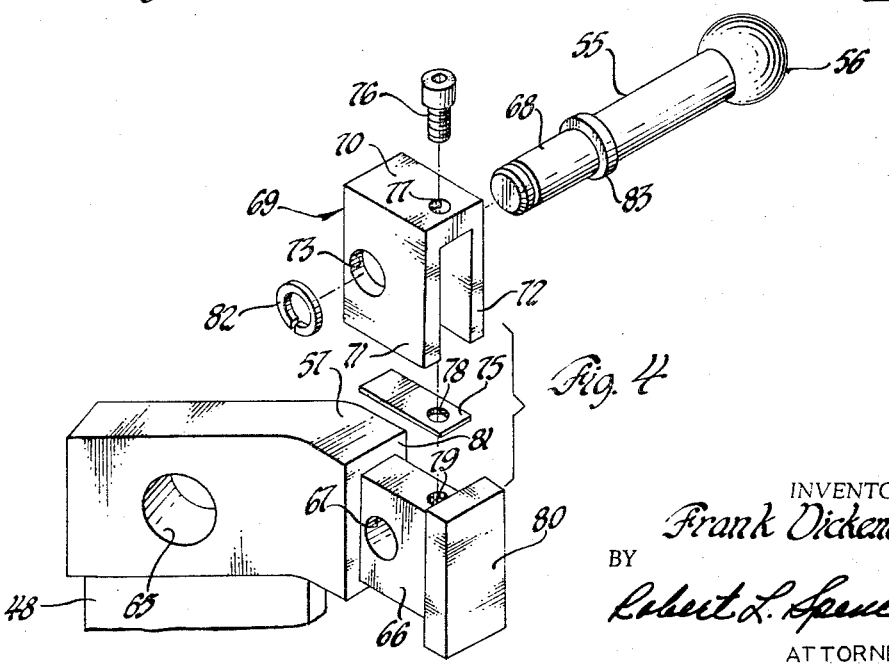
FIGURE 4 is an enlarged view of the cradle control arm and associated parts for providing initial adjustment of the control pin to compensate for manufacturing tolerance error stack-up.

As best shown in detail in FIGURE 4, each cradle 48 is provided with an opening 65 for receiving pin 50 whereby one end of the cradle is supported in spider 15. Pin 50 may be staked to cradle 48 such that the cradle will rotate relative to the spider 15 upon rotation of shaft 61. Control arm 57 on cradle 48 extends from the cradle at an angle to the longitudinal axis of rotation of the cradle about pins 49, 50. Arm 57 is provided with a reduced portion 66 having an opening 67 therethrough for receiving one end 68 of pin 55, the opening 67 being of greater diameter than the external diameter of the end or shank portion 68 of pin 55. An adjustment clip 69 is of generally U-shaped configuration and includes a base 70 and upstanding spaced walls or arms 71, 72 depending from base 70. An opening 73 is provided in each of the arms 71, 72 for receiving shank 68 of pin 55. Also shown in FIGURE 4 is a shim 75. Adjustment clip 69 may be secured to control arm 57 by means of a suitable bolt 76 which may pass through openings 77, 78 in the base 70 of clip 69 and shim 75, respectively, and be received by threads 79 in control arm 57.

The adjustment clip and shim provide means for providing an initial adjustment to compensate for variations in manufacturing tolerance accumulation to assure proper performance of the assembly. The shim 75 may be selected as to thickness to control the position of the actual tilt angle curve such that the actual tilt angle curve corresponds to the desired tilt angle curve. The adjustment clip may be adjusted longitudinally along the arm 57 either toward end 80 of the arm or toward boss 81 on arm 57 to control the slope of the actual desired tilt angle curve. This provides a simple means for correcting for stack up of manufacturing tolerances to make possible initial adjustment of both the position and slope of the tilt angle to obtain the desired tilt angle relationship. In the completed assembly, the shank 68 extends through openings 73 in arms 71, 72 with a close fit. The shank 68 is of smaller diameter than opening 67 in control arm 57, such that the clip 69 may be adjusted relative to arm 57 either outwardly or inwardly of arm 57 and vertically (if necessary) with respect to arm 57 by a shim 75. Once the pin 55 is positioned as desired with respect to arm 57 it is retained in fixed position by tightening bolt 76. As stated ball 56 on pin 55 is received in a slot 54 in carrier arm 51b which accommodates this initial adjustment of the pin relative to the control arm and carrier. A snap ring 82 and a raised annular surface 83 retain pin 55 in a fixed position with respect to adjustment clip 69 such that pin 55 is moved along with clip 69 in establishing the initial adjustment of the clip 69 with respect to control arm 57. The pin ends 50 in FIGURE 2 are received in openings 65 (see FIG. 4) of cradle 48 and are preferably pinned to the cradle such that the cradle and control arm 57 are rotated about pins 50 upon rotation of shaft 61.

What is claimed is:

1. In a transmission, a housing, first and second spaced support spiders grounded to said housing, first and second friction roller units, said friction units each including a power input race, a power delivery race and a friction roller for transmitting torque between said races, the power input races being disposed adjacent each other and intermediate said spiders, common means for driving both input races disposed intermediate said input races, a support sleeve supported in both of said spiders and extending axially through said spiders toward said power delivery races, respectively, an input race support sleeve rotatably supported upon said first-mentioned support sleeve and positioned between said spiders and beneath said input races, a power delivery shaft driven by both of said power delivery races and supported for rotation within said first-mentioned support sleeve, a roller carrier for rotatably supporting the roller of each of said units, respectively, a mooring mast supported in each of said spiders, respectively, means forming a swivel connection between each of said carriers and its respective mooring mast, a cradle supported in each of said spiders, respectively, for rotation about the longitudinal axis of said cradles, respectively, a control arm carried by each of said cradles, respectively, said control arms operatively connecting said respective cradles to said carriers, respectively, for controlling the position of said carriers in response to rotation of said cradles, and common means for simultaneously rotating said cradles to control the position of both of said carriers.

2. A transmission as set forth in claim 1 wherein each of said friction roller units includes a plurality of rollers, cradles, and carriers, and including a ratio control collar for each unit, said ratio control collars being rotatably supported upon said ffrst-mentioned support sleeve, and means connecting the ratio control collar of each unit to each of said cradles in each unit, respectively, whereby each cradle of each unit is simultaneously rotated about the longitudinal axis of the cradle upon rotation of any one cradle about its longitudinal axis.

3. A transmission as set forth in claim 1 including an adjustable connection between said cradle arm and said control pin whereby the position of said control pin may be adjusted relative to said cradle arm.

4. A transmission according to claim 3 wherein said adjustable connection comprises a clip in which said control pin is mounted, an opening through said control arm adapted to receive the shank of said control pin, the diameter of said opening being greater than the diameter of said control pin shank to permit movement of said clip and control pin to a selected position on said control arm, and means for clamping said clip on said control arm in said selected position.

5. In a transmission of the type having a power input race and a power delivery race and having a roller for transmitting torque between said races, means for rotatably supporting said roller including a carrier member and a roller support shaft supported in said carrier member, means for supporting said carrier member including a mooring mast forming with said carrier member a swivel joint between said carrier member and mooring mast; said roller, roller support shaft and carrier member being movable as a unit relative to said mooring mast about said swivel joint, a cradle member, means supporting said cradle member for rotation about the longitudinal axis of said cradle member, means operatively connecting said cradle member to said carrier member for varying the position of said carrier member relative to said mooring mast upon rotation of said cradle member about its longitudinal axis, said connecting means including a slot in one of said members and a pin supported in the other of said members, said pin having a free end disposed in said slot, and means for rotating said cradle member about its longitudinal axis to vary the tilt angle of said roller, relative to said races.

6. A transmission as set forth in claim 5 including adjustable means for adjusting the position of said pin relative to the member in which said pin is supported.

7. In a transmission of the type having a power input and a power delivery race and including a plurality of rollers supported in individual carriers for transmitting torque between said races, a mooring mast support for each of said carriers providing a swivel connection between said masts and carriers, respectively, a cradle for each of said rollers, respectively, means supporting said cradles, respectively, for rotation about the longitudinal axis of each cradle, a rotatable ratio control collar operatively connecting said cradles to each other whereby all of said cradles are caused to pivot about their respective longitudinal axes in response to rotation of one of said cradles about its longitudinal axis, a control arm on one of said cradles, means operatively connecting said control arm to one of said carriers including a control pin carried by said control arm, and means for rotating said cradle to vary the tilt angle of said rollers relative to said races.

8. In a transmission of the type having a power input race and a power delivery race and including a plurality of rollers supported in individual carriers for transmitting torque between said races, a mooring mast support for each of said carriers providing a swivel joint connection between said masts and carriers, respectively, a cradle for each of said rollers, respectively, means supporting said cradles, respectively, for rotation about the longitudinal axis of each cradle, a rotatable ratio control collar operatively connecting said cradles to each other whereby all of said cradles are caused to pivot about their respective axes in response to rotation of one of said cradles about its longitudinal axis, a control arm on one of said cradles, means operatively connecting said control arm to one of said carriers including a control pin carried by said control arm, the position of said pin being adjustable relative to said control arm, means for clamping said pin in a fixed position relative to said control arm, and means for rotating said cradle and said control arm to vary the tilt angle of said rollers relative to said races.

References Cited
UNITED STATES PATENTS

| | | | |
|---|---|---|---|
| 2,097,633 | 11/1937 | Madle | 74—200 |
| 2,131,158 | 9/1938 | Almen et al. | 74—190.5 |
| 3,153,938 | 10/1964 | Perry | 74—200 |
| 3,165,937 | 1/1965 | Tomaszek | 74—190.5 |

FRED C. MATTERN, JR., *Primary Examiner.*